United States Patent [19]

Basiulis

[11] Patent Number: 4,673,030

[45] Date of Patent: Jun. 16, 1987

[54] RECHARGEABLE THERMAL CONTROL SYSTEM

[75] Inventor: Algerd Basiulis, Redondo Beach, Calif.

[73] Assignee: Hughes Aircraft Company, Los Angeles, Calif.

[21] Appl. No.: 198,903

[22] Filed: Oct. 20, 1980

[51] Int. Cl.⁴ .................. F28D 15/00; G05D 23/00
[52] U.S. Cl. ........................... 165/32; 165/41; 165/104.11
[58] Field of Search ............... 165/32, 104.11, 41

[56] References Cited

U.S. PATENT DOCUMENTS

| | | | |
|---|---|---|---|
| 3,613,774 | 10/1971 | Bliss, Jr. et al. | 165/32 |
| 3,651,865 | 3/1972 | Feldmanis | 165/104.11 X |
| 3,735,806 | 5/1973 | Kirkpatrick | 165/32 |
| 4,000,776 | 1/1977 | Kroebig et al. | 165/32 |
| 4,057,101 | 11/1977 | Ruba et al. | 165/185 X |
| 4,057,104 | 11/1977 | Altoz | 165/104.21 X |
| 4,285,027 | 8/1981 | Mori et al. | 165/104.11 |
| 4,377,198 | 3/1983 | Welling et al. | 165/104.11 |

FOREIGN PATENT DOCUMENTS 714107  2/1980  U.S.S.R. ........................ 165/32

Primary Examiner—Albert W. Davis, Jr.
Attorney, Agent, or Firm—Lewis B. Sternfels; Ronald L. Taylor; A. W. Karambelas

[57] ABSTRACT

A unidirectional heat pipe (22) acting as a thermal diode or a heat switch, enables heat to be removed from electronic equipment (14) when temperatures outside of a missile envelope (12) are lower than those of the electronic equipment. When the temperature exterior to the missile envelope is greater than that of the electronic equipment, the heat therefrom is conducted to a package (16) containing phase change material which absorbs the heat from the electronic equipment, at which time the heat pipe acts as a thermal insulator. Heat is also removed from the PCM package by the heat pipe when exterior temperatures are lower than interior temperatures.

11 Claims, 4 Drawing Figures

RECHARGEABLE THERMAL CONTROL SYSTEM

BACKGROUND OF THE INVENTION

1. Field of the Invention

The present invention relates to continuous removal of heat from apparatus and transfer of the heat to a heat sink which is periodically subjected to being otherwise heated to temperatures exceeding that of the apparatus.

2. Description of the Prior Art

Many apparati using electronic equipment present problems for effective dissipation of its self-generated heat. Examples of such apparati include space and airborne vehicles, such as air-to-air missiles and supersonic air-to-ground missiles. Conventional systems are deficient in one or more particulars, and all suffer from the disadvantage that, once they are activated, their cooling capacity becomes depleted and used up, and cannot be reactivated or regenerated without major overhaul of the apparatus. Such systems and their limitations include expendable coolant bottles which are non-rechargable in flight, liquid cooling which requires connection to an aircraft, sensible heat sinks which are limited in their capacity and are non-rechargeable, and phase change material which has limited capacity and is of the type that is not capable of being recharged during operation.

SUMMARY OF THE INVENTION

The present invention overcomes or avoids the above problems by providing a system by which a heat sink is passively coold by means of a unidirectional heat transfer mechanism, e.g., utilizing diurnal cycles or air during free flight. Specifically, heat is continuously removed from an apparatus and transferred by the heat transfer mechanism to the heat sink which, as indicated above, may be periodically subjected to heat from external sources and raised to temperatures exceeding that of the apparatus. Under such heating conditions, the heat from the apparatus is directed to a heat storage unit which stores the heat and which, when the heat sink temperature no longer exceeds that of the apparatus, is cooled and recharged through its coupling by the unidirectional heat transfer mechanism to the heat sink.

It is, therefore, a primary advantage of the present invention that it enables continuous cooling of electronic equipment. Other advantages include the capability of recharging the heat storage unit during operation of the apparatus in which the electronic equipment is used.

Other aims and advantages as well as a more complete understanding of the present invention will appear from the following explanation of exemplary embodiments and the accompanying drawings thereof.

DETAILED DESCRIPTION OF THE INVENTION

Figure 1:
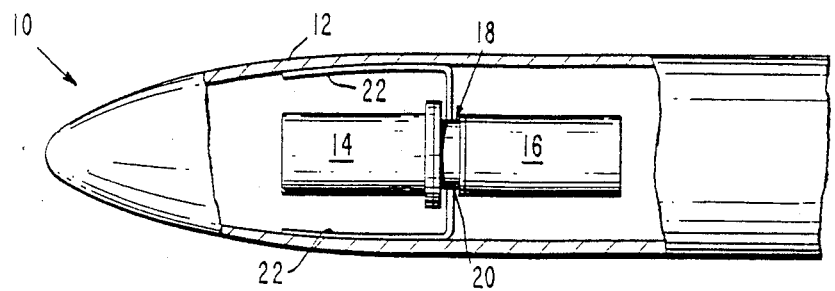
FIG. 1 depicts a portion of a missile in which electronic equipment is thermally coupled to the thermal control system of the present invention.

Referring to FIG. 1, apparatus 10, which may be embodied as a front portion of a missile, includes electronic equipment 14 within its missile envelope 12. The electronic equipment is thermally coupled to a phase change material (PCM) package 16 by a unidirectional heat pipe assembly 18. While shown as being supported solely by the heat pipe assembly, both the electronic equipment and the PCM package are otherwise supported within the missile envelope. As illustrated, heat pipe assembly 18 includes a reservoir 20 and a pair of heat pipes 22, although it is to be understood that one, or more than two, heat pipes may be utilized.

Figure 2:
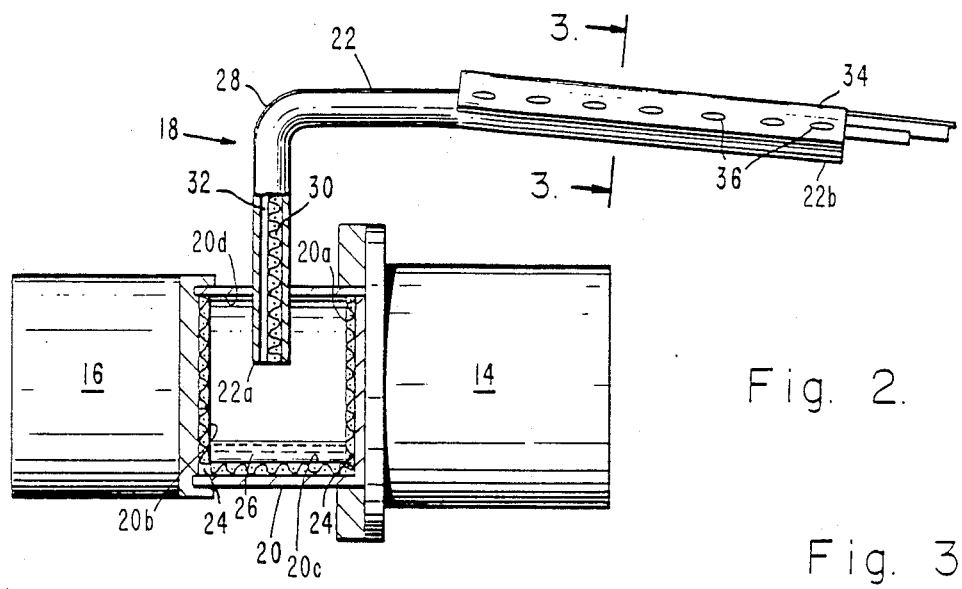
FIG. 2 illustrates a more detailed view of the cooling system of the present invention.
Figure 3:
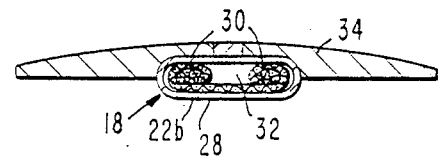
FIG. 3 is a view taken along lines 3—3 of FIG. 2.
Figure 4:
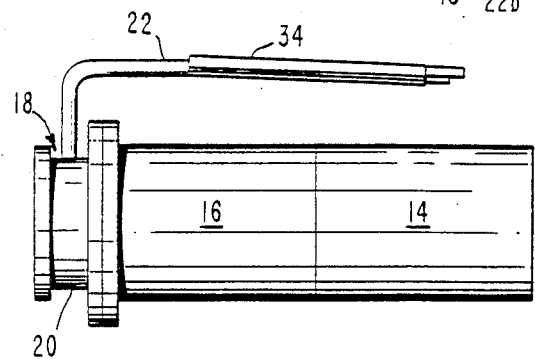
FIG. 4 shows a modification of the cooling system of FIGS. 1 and 2.

As better shown in detail in FIGS. 2 and 3, reservoir 20 comprises a closed compartment having wick material 24 placed substantially on all of its surfaces and, in particular, on those surfaces 20$a$ and 20$b$, respectively, adjacent electronic equipment 14 and PCM package 16 and on bottom surface 20$c$. As shown, wick material 24 has a continuous contact among all surfaces 20$a$, 20$b$ and 20$c$. A working fluid 26 is contained within reservoir 20.

Heat pipe 22 comprises a tube 28 also having a double wick 30 (see also FIG. 3) therein along one of its interior surfaces from a first heat pipe end 22$a$ to a second heat pipe end 22$b$, to act as a conduit for the working fluid in its liquid state. A space 32 within the heat pipe envelope and adjacent wick 30 acts as a path for the working fluid in its vapor state. In the practice of the invention, it is important that wick 30 at first end 22$a$ does not physically contact wick 24 or other interior portions of reservoir 20.

In order to insure physical contact between heat pipe envelope 28 and missile envelope 12, a conforming heat transfer plate 34 is secured by welding or other acceptable means to the heat pipe envelope at heat pipe second end 22$b$ and is secured by rivets 36 or other means of affixation to missile envelope 12.

Phase change materials placable within package 16 are selected to meet the cooling requirements of specific electronic compenents. For example, there are waxes with melting temperatures in the range 20° C. to 120° C. Examples of such waxes, organic materials and other inorganic materials, whose melting points are placed in parentheses, include n-heptadecane $C_{17}H_{36}$ (21.7° C.), n-heneicosane $C_{21}H_{44}$ (40° C.), paraffin wax (54.4° C.), methyl fumarate $(CHCO_2CH_3)_2$ (10° C.), gallium Ga (30° C.), bismuth-lead-tin, 52.2 Bi+32 Pb+15.5 Sn (96° C.).

Cooling media external to missile envelope 12 may include forced convection, cold plate, ram air, and diurnal cycles.

In operation, during the cooling cycle, heat is removed from both electronic equipment 14 and PCM package 16, thus causing the phase change material therein to undergo a phase change, for example, from a liquid state to a solid state, i.e., the phase change material is solidified. Under these conditions, since electronic equipment 14 and PCM package 16 are hotter than missile envelope 12, working fluid 26 is evaporated and moves as a vapor from reservoir 20 to heat pipe 22 for condensation therein adjacent heat transfer plate 34. The working fluid vapor thus condenses and moves back into reservoir 20 through wick 30. Because of the lack of physical contact between wick 30 and wick 24 or other interior portions of reservoir 20, the condensed fluid will collect and drip from wick 30 into the reservoir. Such dripping occurs in any orientation of heat pipe assembly 18 except when the open end 22a of heat pipe tube 18 in the reservoir is gravitationally higher than its closed end at plate 34. However, because there can be at least two heat pipes 18, such as illustrated in FIG. 1, there will be at least one heat pipe whose open end is gravitationally lower than its closed end. Thus, heat transfer is always assured.

In addition, the open end of tube 28 is shown to extend within reservoir 20 beyond the wall thereof shown without wick 24. Such an arrangement has been found to have the distinctively ameliorative advantage of preventing liquid working fluid from being forced into tube 28 during the exertion of high gravitational loads directed towards the open tube end. Such liquid would accumulate on that reservoir wall 20d having no wick 24 and about the exterior portion of tube 28 extending within the reservoir.

When missile envelope 12 is hotter than equipment 114, heat pipe 22 cannot act as a heat transfer device. For example, during supersonic flight, or during the heat of day, the heat pipe, which acts as a thermal diode, switches off, inasmuch as its end 22b at plate 34 is hotter than its end 22a in reservoir 20 and is at a temperature at least equal to the vaporization temperature of the working fluid. In particular, working fluid at its end 22b at plate 34 is vaporized and the vapor condenses in the reservoir. Because of the absence of physical contact between wick 30 at end 22a and the reservoir, the working fluid as a liquid is trapped in the reservoir. Thus, heat pipe 22 becomes a thermal insulator. Under such conditions and during operation of the electronic equipment, its generated heat is absorbed by the phase change material in package 16, with reservoir 20 and its wick 24 acting as a heat pipe. During this portion of the operating cycle, some or all of the phase change material is liquified.

During subsonic flight when the temperature outside the missile envelope is lower than that of equipment 14 and the vaporization point of the selected working fluid, heat pipe 22 becomes operable to transfer heat in parallel from electronic equipment 14 and PCM package 16 to missile envelope 12 through plate 34, thus cooling the electronic equipment and recharging the PCM package by solidifying its phase change material.

While FIG. 2 depicts reservoir 20 to be sandwiched between electronic equipment 14 and PCM package 16, FIG. 14 illustrates modifications in the arrangement by placing PCM package 16 intermediate or in series with electronic equipment 14 and reservoir 20.

It is to be understood that, while package 16 contains a phase change material, other materials may be used, such as a metal block, so that package 16 would operate as a sensible heat sink.

Although the invention has been described with reference to particular embodiments thereof, it should be realized that various changes and modifications may be made therein without departing from the spirit and scope of the invention.

What is claimed is:

1. A rechargeable thermal control system for removing heat from a source thereof comprising:
    a liquid reservoir thermally couplable to the heat source by means for receiving and retaining working fluid in thermal proximity to the heat source;
    a heat pipe condenser and transport for the working fluid having first and second ends which respectively extend into and from said reservoir, said first end and said reservoir cooperating as a heat pipe evaporator, and a wick in and extending through said transport and spaced at said first end from said working fluid receiving and retaining means and essentially from wicking contact with said working fluid when in its liquid state;
    thermally conductive means coupled to said second end for conducting heat from said heat pipe condenser to a heat sink; and
    heat storage means having a thermal coupling to the heat source for absorbing heat therefrom and having a thermal coupling to said second end when said second end is at a temperature lower than said heat storage means.

2. A system according to claim 1 in which said heat source comprises electronic devices.

3. A system according to claim 2 which said means coupled to said second end comprises a surface subject to a flowing medium having variable rates of flow.

4. A system according to claim 3 in which said surface comprises a vehicle enclosure and said flowing medium comprises air flowing past the enclosure during flight of the vehicle.

5. A system according to claim 1 in which said liquid reservoir is positioned between said heat source and said heat storage means and includes a wick on its internal surfaces, with a separation between said reservoir and said heat pipe wick, to function as a second heat pipe while said heat storage means absorbs heat from said heat source.

6. A system according to claim 1 in which said heat source is secured to said liquid reservoir and said heat storage means is secured to said heat source.

7. A system according to claim 1 wherein said heat storage means comprises phase change material.

8. A system according to claim 1 wherein said heat storage means comprises a sensible heat sink.

9. A system according to claim 1 wherein said first end of said heat pipe condenser and transport extends into said first reservoir away from its walls for enabling said first end to be spaced from said working fluid receiving and retaining means.

10. A system according to claim 1 in which said heat storage means is coupled to the heat source through said evaporator.

11. A system for removing heat from electronic components in a missile having an envelope and for providing unidirectional flow of the heat to the envelope comprising:
    a heat storage unit;
    means including a heat pipe wick thermally coupled to said heat storage unit and the electronic components and capable of acting as a heat pipe; and
    a unidirectional heat pipe condenser and transport for a working fluid thermally coupled at a first end thereof to said thermal coupling means to cooperate therewith in part as a condenser for said thermal coupling means, and thereby coupled to both said heat storage unit and said electronic components, and at a second end thereof to the missile envelope, for removing heat from both the electronic components and said heat storage unit only when the envelope is cooler than the electronics and said heat storage unit.

* * * * *